United States Patent
Cho et al.

(10) Patent No.: US 9,972,130 B2
(45) Date of Patent: May 15, 2018

(54) APPARATUS AND METHOD FOR IMPLEMENTING AUGMENTED REALITY BY USING TRANSPARENT DISPLAY

(71) Applicant: Samsung Electronics Co., Ltd., Suwon-si, Gyeonggi-do (KR)

(72) Inventors: Kyu-Sung Cho, Suwon-si (KR); Dae-Kyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 14/243,255

(22) Filed: Apr. 2, 2014

(65) Prior Publication Data
US 2014/0300634 A1   Oct. 9, 2014

(30) Foreign Application Priority Data
Apr. 9, 2013   (KR) .................. 10-2013-0038825

(51) Int. Cl.
*G06T 19/00* (2011.01)
*G06F 3/01* (2006.01)

(52) U.S. Cl.
CPC .......... *G06T 19/006* (2013.01); *G06T 19/00* (2013.01)

(58) Field of Classification Search
CPC .................. G06T 19/00; G06F 3/01
See application file for complete search history.

(56) References Cited

U.S. PATENT DOCUMENTS

| | | | |
|---|---|---|---|
| 2006/0227138 A1* | 10/2006 | Oizumi | 345/428 |
| 2011/0310238 A1 | 12/2011 | Koh et al. | |
| 2012/0072873 A1* | 3/2012 | Park et al. | 715/863 |
| 2013/0234934 A1* | 9/2013 | Champion et al. | 345/156 |
| 2013/0260360 A1* | 10/2013 | Baurmann | G06F 3/14 434/365 |

OTHER PUBLICATIONS

Deza et al., "Encyclopedia of distances", p. 593, Michel Marie Deza, Elena Deza Springer Science & Business Media, Oct. 28, 2012—Mathematics,.*

* cited by examiner

*Primary Examiner* — Tapas Mazumder
(74) *Attorney, Agent, or Firm* — Jefferson IP Law, LLP

(57) ABSTRACT

An apparatus and a method for implementing augmented reality by using a transparent display are provided. The method includes calculating a point-of-view of a user based on a face image captured by a front camera, detecting an image of an area depending on an angle of view identical to a viewing angle of the user based on the calculated point-of-view of the user, implementing the augmented reality by using the detected image, and outputting the implemented augmented reality to the transparent display.

11 Claims, 5 Drawing Sheets

APPARATUS AND METHOD FOR IMPLEMENTING AUGMENTED REALITY BY USING TRANSPARENT DISPLAY

CROSS-REFERENCE TO RELATED APPLICATION(S)

This application claims the benefit under 35 U.S.C. § 119(a) of a Korean patent application filed on Apr. 9, 2013 in the Korean Intellectual Property Office and assigned Serial No. 10-2013-0038825, the entire disclosure of which is hereby incorporated by reference.

TECHNICAL FIELD

The present disclosure relates generally to an apparatus and a method for implementing augmented reality. More particularly, the present disclosure relates to an apparatus and a method for implementing augmented reality by using a transparent display.

BACKGROUND

A mobile terminal typically includes a screen implemented by a Liquid Crystal Display (LCD) or an Active Matrix Organic Light Emitting Diode (AMOLED) display on a front surface thereof, and includes a camera on a rear surface thereof. When augmented reality is implemented in such a mobile terminal, an image is received as an input by a rear camera, and an object of interest is recognized by analyzing the received image. Then, the mobile terminal synthesizes virtual information, such as images and/or text, with the recognized object of interest and displays the virtual information synthesized with the recognized object of interest together on the screen thereof.

More recently, apparatuses including a transparent display, such as a transparent LCD, a transparent glass, or a transparent liquid crystal panel, have become widely used. Such apparatuses may include a transparent display to display a background image of a point-of-view that a user views on the screen.

When an apparatus including the transparent display (as described above) implements augmented reality, it captures a background image of a point-of-view that the user is viewing, analyzes the captured background image and thereby recognizes an object of interest, maps virtual information to the recognized object of interest, and displays the virtual information mapped to the recognized object of interest on a transparent display screen thereof.

However, the apparatus including the transparent display changes the background image displayed by the transparent display according to a point-of-view and a viewing angle of the user. Accordingly, a problem occurs in that the background image displayed by the transparent display does not coincide with a background image received from a rear camera included in the apparatus.

In other words, when the apparatus including the transparent display implements augmented reality and a background image captured according to a point-of-view and a viewing angle of the user does not coincide with a background image received from the rear camera, a problem occurs in that the apparatus recognizes an object that does not interest the user and maps virtual information to a position of the object that does not interest the user.

Therefore, a need exists for an apparatus and a method for implementing augmented reality by using a transparent display.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for implementing augmented reality by using a transparent display.

In accordance with an aspect of the present disclosure, an apparatus including a transparent display for implementing augmented reality is provided. The apparatus includes a transparent display unit, a front camera unit configured to capture a face image of a user, a rear camera unit configured to capture a background image, an augmented reality implementation unit configured to recognize an object of interest in an image, to map virtual information to the recognized object of the interest, and to implement the augmented reality, and a control unit configured to calculate a point-of-view of the user based on the face image, to detect an image of an area depending on an angle of view identical to a viewing angle of the user, to implement the augmented reality by using the detected image, and to output the implemented augmented reality to the transparent display unit.

In accordance with another aspect of the present disclosure, a method of implementing augmented reality by using a transparent display is provided. The method includes calculating a point-of-view of a user based on a face image captured by a front camera, detecting an image of an area depending on an angle of view identical to a viewing angle of the user, implementing the augmented reality by using the detected image, and outputting the implemented augmented reality to the transparent display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms including ordinal numbers such as first and second may be used herein to describe various elements, these elements should not be limited by these terms. These terms are only used to distinguish one element from another. For example, a first element could be termed a second element, and similarly, a second element could be termed a first element, without departing from the scope of right of the present disclosure. The terminology used herein is for the purpose of describing particular embodiments of the present disclosure, and does not limit the scope of the present disclosure. As used herein, the term "and/or" includes any and all combinations of one or more of the associated listed items.

Figure 1:
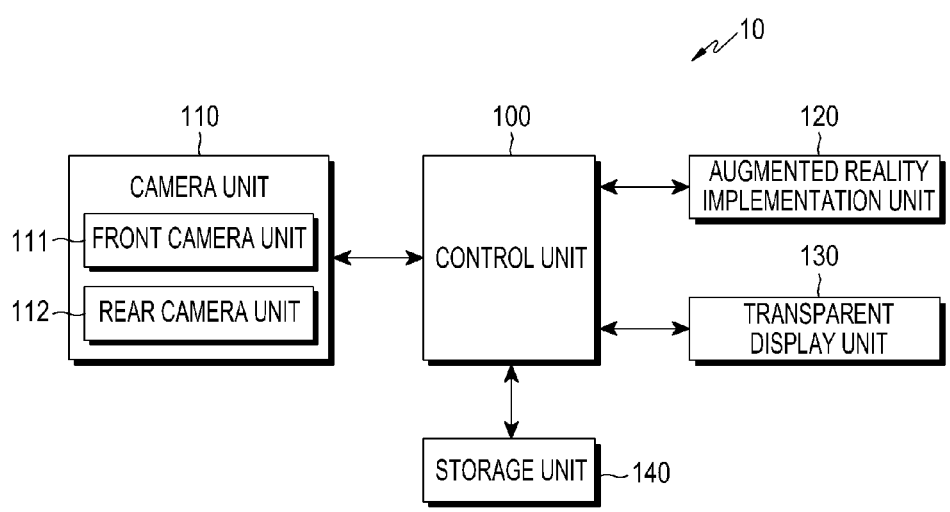
FIG. 1 is a block diagram illustrating a configuration of an apparatus including a transparent display according to an embodiment of the present disclosure.

FIG. 1 is a block diagram illustrating a configuration of an apparatus including a transparent display according to an embodiment of the present disclosure.

Referring to FIG. 1, the apparatus 10 including a transparent display according to an embodiment of the present disclosure includes a control unit 100, a camera unit 110 including a front camera unit 111 and a rear camera unit 112, an augmented reality implementation unit 120, a transparent display unit 130, and a storage unit 140.

The control unit 100 typically controls an operation of the apparatus 10 including the transparent display. More particularly, the control unit 100 controls the front camera unit 111 to receive a face image of a user, and calculates a point-of-view (hereinafter, a point-of-view may be referred to as "eye-gaze") of the user based on the received face image of the user. For example, the control unit 100 may calculate a three-dimensional point-of-view of the user based on the received face image of the user by using an eye tracking technology. In an embodiment of the present disclosure, the three-dimensional point-of-view of the user is calculated by using the eye tracking technology. However, various additional or alternative technologies may be used to calculate the three-dimensional point-of-view of the user.

The control unit 100 controls the rear camera unit 112 to receive a background image, and calculates a point-of-view of the rear camera unit 112 based on the received background image. For example, the control unit 100 may calculate a three-dimensional point-of-view of the rear camera unit 112 based on a background image.

The control unit 100 moves a point-of-view and a viewing angle of the rear camera unit 112 so as to cause the calculated point-of-view of the user to coincide with the calculated point-of-view of the rear camera unit 112, and so as to cause a viewing angle of the user to coincide with a viewing angle of the rear camera unit 112. For example, the control unit 100 moves a three-dimensional point-of-view of the rear camera unit 112 so as to cause the three-dimensional point-of-view of the rear camera unit 112 to coincide with a three-dimensional point-of-view of the user by using the three-dimensional point-of-view of the user as a reference. A background image received, as input, from the three-dimensional point-of-view of the rear camera unit 112 which has been moved as described above, coincides with a background image according to a point-of-view of the user. Then, the control unit 100 detects an image of an area in which a viewing angle of the user coincides with an angle of view of the rear camera from among input background images input from the moved three-dimensional point-of-view of the rear camera unit 112; controls the augmented reality implementation unit 120 to implement augmented reality by using the detected image; and controls the transparent display unit 130 to output the implemented augmented reality.

The camera unit 110 may include the front camera unit 111 and the rear camera unit 112, and may capture images (e.g., still images or moving images). More particularly, the camera unit 110 according to an embodiment of the present disclosure may capture a face image of the user by using an eye tracking function, and may deliver the captured face image to the control unit 100.

The front camera unit 111 may be mounted at a position capable of capturing a face of the user when the user looks directly at the transparent display unit 130. The rear camera unit 112 may be mounted at the rear of the front camera unit 111 at a position capable of capturing a background image at which the user looks when the user looks directly at the transparent display unit 130.

Figure 2A:
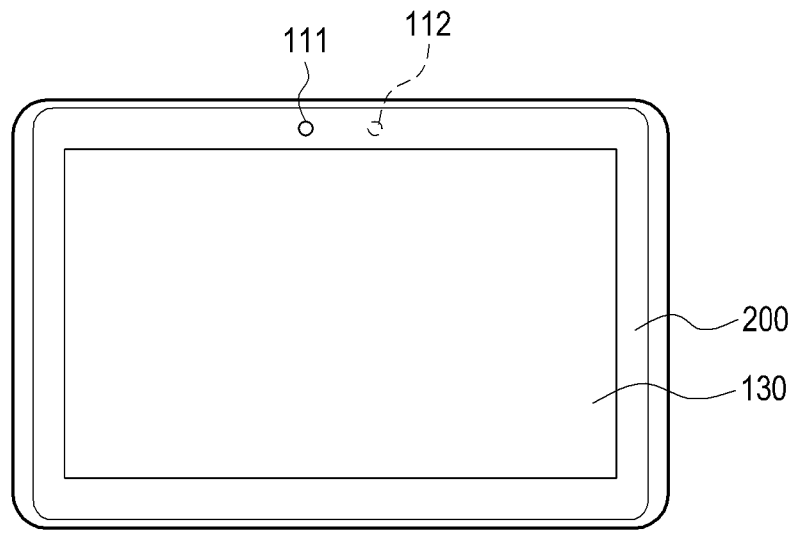
FIGS. 2A and 2B are views illustrating an example of the position of a front camera unit and a rear camera unit in an apparatus including a transparent display according to an embodiment of the present disclosure.
Figure 2B:
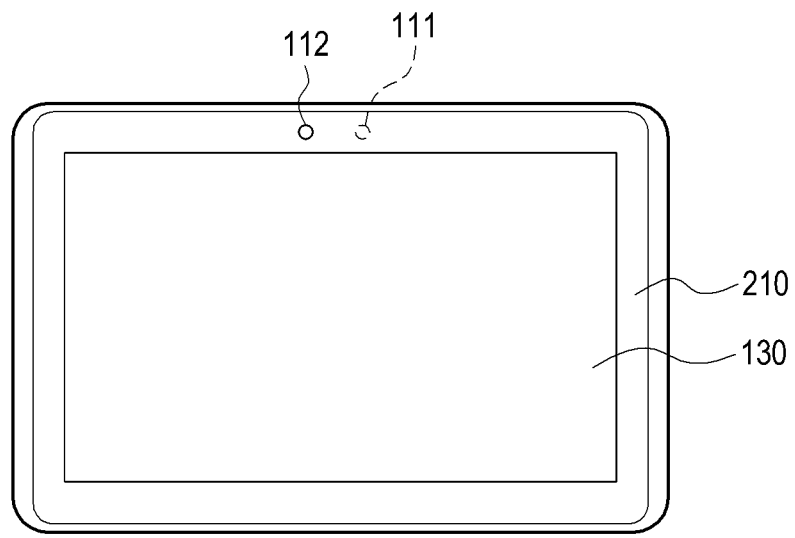

FIGS. 2A and 2B are views illustrating an example of the position of a front camera unit and a rear camera unit in an apparatus including a transparent display according to an embodiment of the present disclosure.

Referring to FIG. 2A, the front camera unit 111 may be defined as a camera mounted at a position capable of capturing a face of the user when the user looks directly at the transparent display unit 130 at a position facing a front surface 200 of the apparatus 10 including the transparent display. As illustrated in FIG. 2B, the rear camera unit 112 may be defined as a camera mounted at a position capable of capturing a background at which the user looks when the user looks directly at the transparent display unit 130 at a position facing a rear surface 210 of the apparatus 10 including the transparent display.

Because the camera unit 110, which may capture a still image or a moving image, is apparent to those having ordinary knowledge in the technical field of the present disclosure. Accordingly, a detailed description thereof will be omitted.

The augmented reality implementation unit 120 analyzes a background image selected by the control unit 100 by using typical image recognition techniques and thereby recognizes an object of interest and maps virtual information to the recognized object of interest. In embodiments of the present disclosure, the virtual information signifies additional information, such as the name, the position, a description, or the like, of the recognized object of interest.

The transparent display unit 130 includes a transparent device and displays a background that the eyes of the user see without any change from what the user may see as background through transparent glass. The transparent display unit 130 as described above may be divided into a see-through display and a direct-view display. Examples of the see-through display may include a Head Up Display (HUD) and a Head-Mounted Display (HMD). Examples of the direct-view display may include a transparent Liquid Crystal Display (LCD) and a transparent Organic Light-Emitting Diode (OLED) display. In an embodiment of the present disclosure, the transparent display unit 130 outputs augmented reality implemented by the augmented reality implementation unit 120. More particularly, in an embodiment of the present disclosure, virtual information that the augmented reality implementation unit 120 has mapped is output by the transparent display unit 130.

According to the control of the control unit 100, the storage unit 140 may store signals or data which are input or output in response to operations of the camera unit 110, the augmented reality implementation unit 120, or the transparent display unit 130. Also, the storage unit 140 may store control programs and applications for controlling the apparatus 10 including the transparent display for implementing augmented reality or those for the control unit 100.

Figure 3:
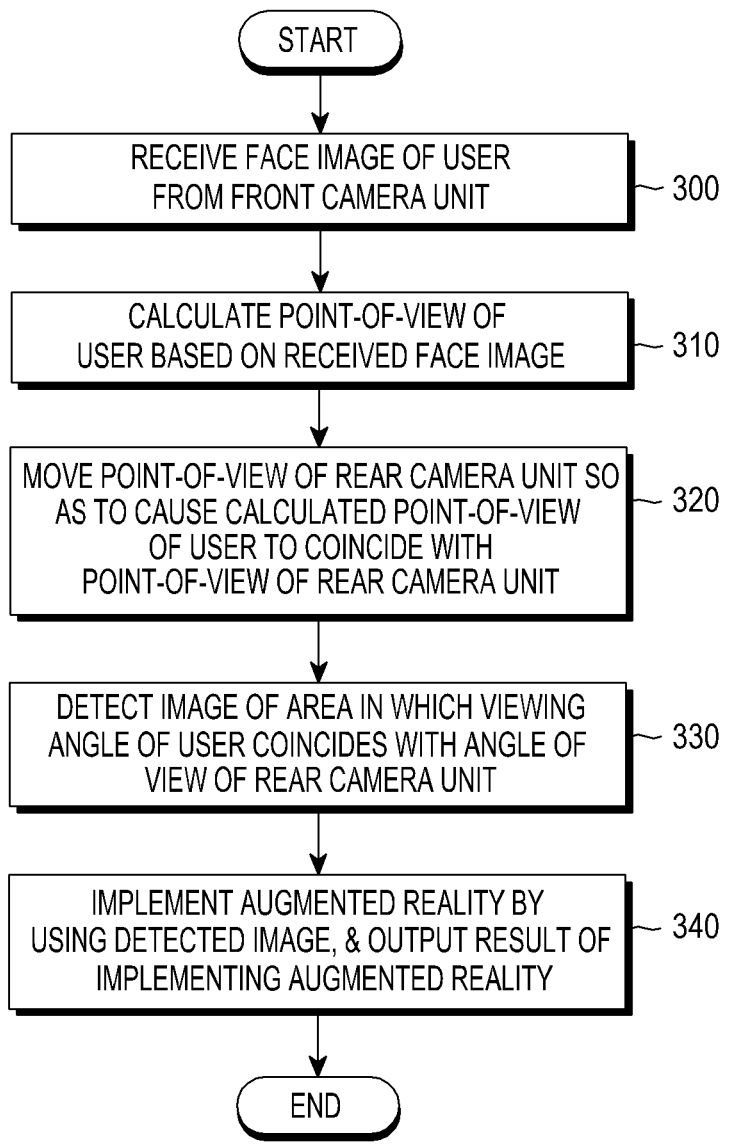
FIG. 3 is a flowchart illustrating a method for implementing augmented reality by an apparatus including a transparent display according to an embodiment of the present disclosure.

FIG. 3 is a flowchart illustrating a method for implementing augmented reality by an apparatus including a transparent display according to an embodiment of the present disclosure.

Referring to FIG. 3, at operation 300, the control unit 100 receives a face image of a user from the front camera unit 111. Specifically, the control unit 100 receives an image including the face of the user from the front camera unit 111.

At operation 310, the control unit 100 calculates a point-of-view of the user based on the image including the face of the user. Specifically, when the face is included in the received image, the control unit 100 calculates a three-dimensional point-of-view of the user which indicates the position of the user and which direction the user is facing by using the eye tracking technology. In embodiments of the present disclosure, the three-dimensional point-of-view may be expressed by roll, yaw and pitch angles which are relative rotation values of the front camera unit 111, or by coordinates along the x, y and z axes which are displacement values of the front camera unit 111. Also in embodiments, the three-dimensional point-of-view may be expressed by a straight line representing a direction that the eyes of the user or the camera are facing.

At operation 320, the control unit 100 moves a point-of-view of the rear camera unit 112 so as to cause the calculated point-of-view of the user to coincide with the point-of-view of the rear camera unit 112. In other words, the control unit 100 moves roll, yaw and pitch angles of the rear camera unit 112 and coordinates along the x2, y2 and z2 axes which are displacement values of the rear camera unit 112, which represent a three-dimensional point-of-view of the rear camera unit 112 to the three-dimensional point-of-view of the user, with roll, yaw and pitch angles of the front camera unit 111 and coordinates along the x1, y1 and z1 axes which are displacement values of the front camera unit 111, which represent the three-dimensional point-of-view of the user, as a reference.

At operation 330, the control unit 100 detects an image corresponding to an area, in which a viewing angle of the user coincides with an angle of view of the rear camera unit 112. In other words, the control unit 100 calculates a reference angle depending on the width of the transparent display unit 130 and the distance from the user. More particularly, the control unit 100 calculates a reference angle generated by the intersection of straight lines from both ends of the transparent display unit 130 to the user. Then, the control unit 100 detects an image of an area depending on an angle of view identical to the reference angle, with the moved point-of-view of the rear camera unit 112 as a reference from among a plurality of background images received from the rear camera unit 112. In embodiments, the viewing angle of the user may signify a viewing angle of an average person.

At operation 340, the control unit 100 implements augmented reality by using the detected image, and then outputs a result of implementing the augmented reality. In other words, the control unit 100 controls the augmented reality implementation unit 120 to recognize an object of interest by analyzing the detected image, and to map virtual information to the recognized object of interest. Then, the control unit 100 controls the transparent display unit 130 to output the virtual information that the augmented reality implementation unit 120 has mapped to the recognized object of interest.

As described above, the apparatus including the transparent display according to an embodiment of the present disclosure may accurately map virtual information to an object of interest, and may provide the user with the virtual information mapped to the object of interest.

Figure 4:
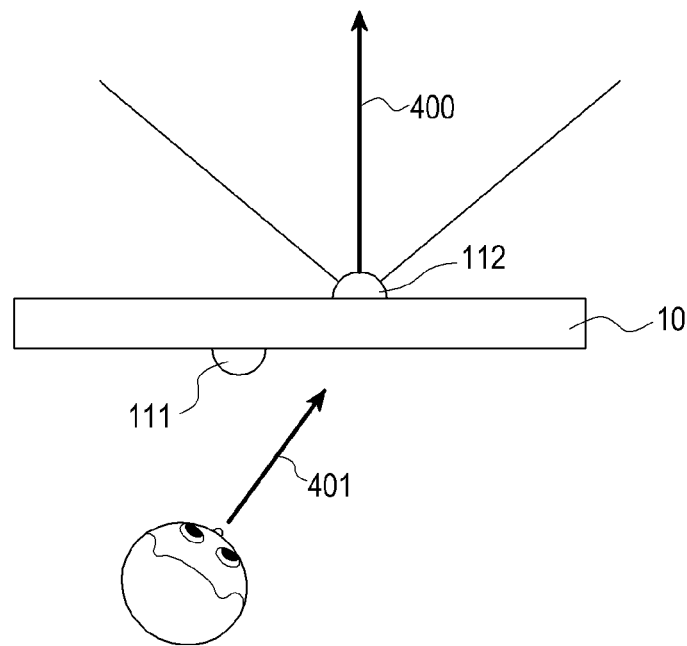
FIGS. 4, 5, and 6 are views illustrating examples of operations for implementing augmented reality in an apparatus including a transparent display according to an embodiment of the present disclosure.
Figure 5:
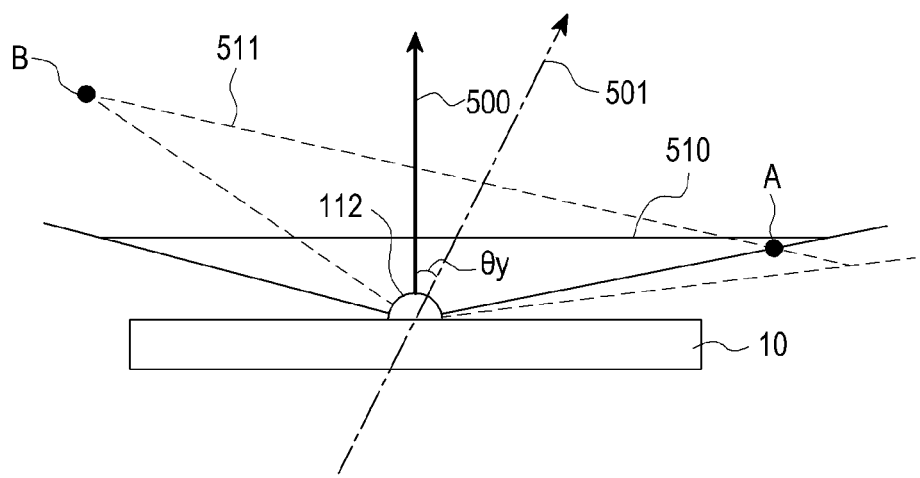
Figure 6:
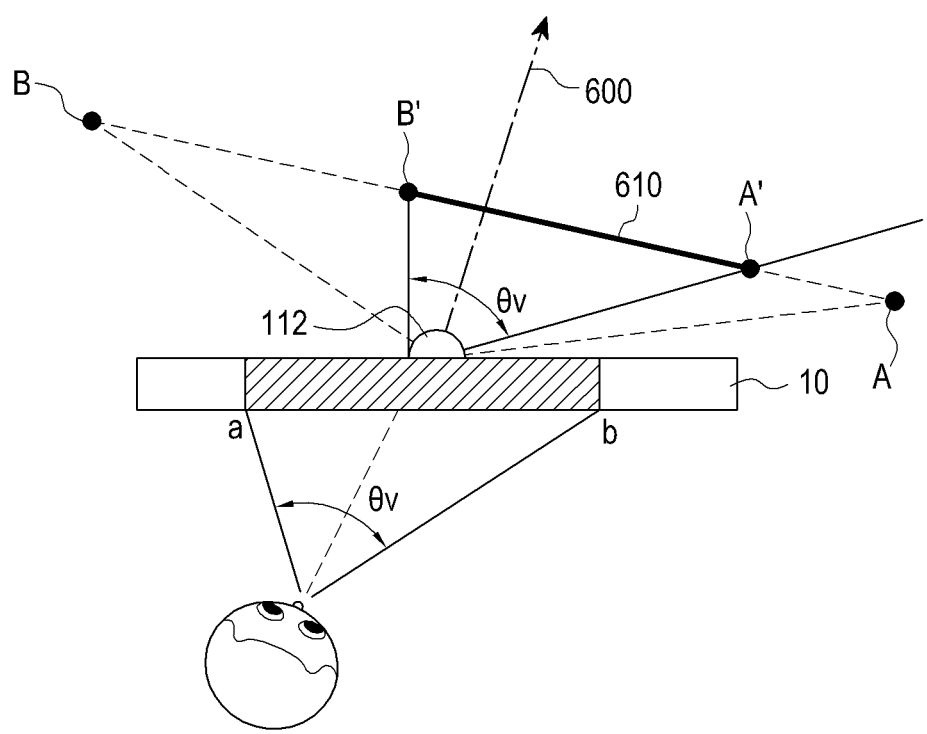

FIGS. 4, 5, and 6 are views illustrating examples of operations for implementing augmented reality in an apparatus including a transparent display according to an embodiment of the present disclosure.

Referring to FIGS. 4, 5 and 6, an embodiment will be described as an example in which the apparatus 10 including the transparent display includes the front camera unit 111 in front of the user, and includes the rear camera unit 112 at an opposite side thereof. Also, in an embodiment of the present disclosure, a point-of-view, an angle of view, and a viewing angle may be expressed in two-dimensional form, but are not limited thereto. They may also be expressed in three-dimensional form.

FIG. 4 is a view illustrating an example of a point-of-view of a user and a point-of-view of a rear camera unit according to an embodiment of the present disclosure.

Referring to FIG. 4, the rear camera unit 112 has the point-of-view as indicated by reference numeral 400, and the user has the point-of-view as indicated by reference numeral 401. The control unit 100 may calculate the point-of-view 401 of the user based on an image including the face of the user, which is received from the front camera unit 111.

FIG. 5 is a view illustrating an example of an operation for causing a point-of-view of a user to coincide with a point-of-view of a rear camera unit according to an embodiment of the present disclosure.

Referring to FIG. 5, in an embodiment of the present disclosure, the point-of-view of the rear camera unit 112 is indicated by reference numeral 500, and the point-of-view of the user is indicated by reference numeral 501.

In order to acquire an image which coincides with a background seen from the calculated point-of-view 501 of the user, the control unit 100 converts a reference image received, as input, from the point-of-view 500 of the rear camera unit 112 into an image received, as input, from the point-of-view 501 of the user.

For example, in an embodiment of the present disclosure, an angle difference between a center line of the point-of-view of the rear camera unit 112 and a center line of the point-of-view of the user is represented by θy. In this case, the center line of the point-of-view 501 of the user may be expressed by a straight line which bisects a viewing angle of the user.

Further, referring to FIG. 5, an image area which is received, as input, according to an angle of view of the rear camera unit 112, with the point-of-view 500 of the rear camera unit 112 as a reference, may be indicated by reference numeral 510.

As described above, the point-of-view 501 of the user has a difference of θy from the point-of-view 500 of the rear camera unit 112. Accordingly, in order to acquire an image received, as input, from the point-of-view 501 of the user, the control unit 100 converts a reference image into an image rotated by θy so as to cause the reference image to coincide with the point-of-view 501 of the user. In embodiments, the control unit 100 may convert the reference image by using a two-dimensional homography image conversion technology. In an embodiment of the present disclosure, the use of the two-dimensional homography image conversion technology is described as an example; however, embodiments of the present disclosure are not limited thereto. Accordingly, it is possible to use an image conversion technology for converting a reference image into an image rotated by θy so as to cause the reference image to coincide with the point-of-view 501 of the user.

The image converted, as described above, is matched to an image area 511 received, as input, from a point-of-view, to which the point-of-view of the rear camera unit 112 has been moved by θy so as to cause the point-of-view of the rear camera unit 112 to coincide with the point-of-view 501 of the user.

In embodiments, it may be impossible to output an image of an area which deviates from the angle of view of the rear camera unit 112. Accordingly, an image that the transparent display unit 130 outputs corresponds to an area ranging from A to B. According to another embodiment of the present disclosure, a wide-angle camera may be used as the rear camera unit 112, in order to cause an image received, as input, from a given point-of-view, to a point-of-view to which the rear camera unit 112 has been moved, as represented by θy, to be included in the area ranging from A to B.

Then, the control unit 100 detects an image which coincides with a background that the user may see through the transparent display unit 130. The detection of the image will be described in detail below with reference to FIG. 6.

FIG. 6 is a view illustrating an example of an operation for detecting an image corresponding to an area in which a viewing angle of a user coincides with a viewing angle of a rear camera unit according to an embodiment of the present disclosure.

Referring to FIG. 6, in order to extract an image which coincides with a background that the user may see through the transparent display unit 130, the control unit 100 calculates a reference angle θv generated by the intersection of straight lines from both ends a and b of the transparent display unit 130 to the user.

Then, the control unit 100 detects an image 610 of an area depending on an angle of view that is identical to the reference angle θv, with a center line 600 representing a point-of-view of the rear camera unit 112 as a reference, from among converted images. In other words, the control unit 100 may detect an image of an area from A' to B' depending on an angle of view identical to the reference angle θv within an area from A to B corresponding to a converted image.

Thereafter, the control unit 100 may control the augmented reality implementation unit 120 to recognize an object of interest by analyzing the detected image and to map virtual information to the recognized object of interest. Then, the control unit 100 may control the transparent display unit 130 to output the virtual information that the augmented reality implementation unit 120 has mapped to the recognized object of interest.

Embodiments of the present disclosure have been described having a configuration for acquiring an image similar to a background that the user sees through the transparent display by using an angle such that the viewing angle of the user overlaps the width of the transparent display. However, embodiments of the present disclosure may also include a configuration for acquiring an image similar to a background that the user sees through the transparent display by using an angle such that a viewing angle of the user overlaps the width and height of the transparent display.

As described above, the apparatus and the method for implementing augmented reality by using the transparent display, according to an embodiment of the present disclosure, acquires an image identical to a background that the user sees through the transparent display, and accurately maps virtual information to the position of an object of interest in the acquired image. Accordingly, it is possible to provide more accurately implemented augmented reality to the user who has the apparatus including the transparent display.

It will be appreciated that the embodiments of the present disclosure may be implemented in the form of hardware, software, or a combination thereof. Any such software may be stored in a volatile or non-volatile storage device such as a Read-Only Memory (ROM), or in a memory such as a Random Access Memory (RAM), a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine (e.g., a computer), regardless of whether the software can be deleted or rewritten. It will be appreciated that the method for implementing augmented reality according to embodiments of the present disclosure may be implemented by using a computer or a portable terminal including a controller and a memory, and that the memory is an example of a non-transient machine-readable storage medium suitable for storing a program or programs including instructions for implementing the embodiments of the present disclosure. Accordingly, embodiments of the present disclosure may include a program including codes for implementing an apparatus or a method which is claimed in any claim of this specification, and a non-transitory storage medium which stores this program and is readable by a machine.

Also, the apparatus for implementing augmented reality may receive and store the program from a device for providing a program, which is connected by wire or wirelessly to the apparatus for implementing augmented reality. The device for providing a program may include a memory for storing a program including instructions which cause the apparatus for implementing augmented reality to perform a previously-set method for implementing augmented reality, and information required for the method for implementing augmented reality; a communication unit for performing wired or wireless communication with the apparatus for implementing augmented reality; and a controller for performing a control operation so as to transmit the relevant program to the apparatus for implementing augmented reality, at a request from the apparatus for implementing augmented reality or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus comprising a transparent display for implementing augmented reality, the apparatus comprising:
    a transparent display;
    a front camera;
    a rear camera configured to capture a first background image;
    a memory; and
    a processor electrically connected to the transparent display, the front camera, the rear camera, and the memory,
        wherein the memory stores instructions that, when executed, cause the processor,
            to control the front camera to capture a face image,
            to control the rear camera to capture a first background image,
            to convert the first background image into a second background image based on a gaze direction determined by using the face image,
            to extract an image of a first area from the second background image based on a viewing angle of the user,
            to generate an augmented reality image based on the extracted image,
            to display the augmented reality image on the transparent display, and
        wherein the first background image is converted into the second background image by moving or rotating the first background image based on the gaze direction.

2. The apparatus as claimed in claim 1, wherein the instructions further cause the processor to match a shooting direction of the rear camera to the gaze direction of the user.

3. The apparatus as claimed in claim 1, wherein the instructions further cause the processor to move the shooting direction of the rear camera to a position matched to the gaze direction of the user.

4. The apparatus as claimed in claim 1, wherein the instructions further cause the controller,
    to detect an object of interest by analyzing the extracted image,
    to map virtual information to the detected object of the interest,
    to generate the augmented reality image including the virtual information and the detected object of the interest, and
    to display the augmented reality image on the transparent display.

5. The apparatus as claimed in claim 1, wherein the rear camera is a wide-angle camera.

6. A method of implementing augmented reality by using a transparent display, the method comprising:
    receiving a face image from a front camera;
    receiving a first background image from a rear camera;
    converting the first background image into a second background image based on a gaze direction determined by using the face image;
    extracting an image of a first area from the second background image captured by a rear camera based on a viewing angle of the user;
    generating an augmented reality image based on the extracted image;
    displaying the augmented reality image on the transparent display, and
    wherein the first background image is converted into the second background image by moving or rotating the first background image based on the gaze direction.

7. The method as claimed in claim 6, further comprising:
    matching a shooting direction of the rear camera to the gaze direction of the user.

8. The method as claimed in claim 7, further comprising:
    moving the shooting direction of the rear camera to a position matched to the gaze direction of the user.

9. The method as claimed in claim 6, wherein the generating of the augmented reality image based on the extracted image comprises:
    detecting an object of interest by analyzing the extracted image;
    mapping virtual information to the detected object of the interest; and
    generating the augmented reality image including the virtual information and the detected object of the interest.

10. The method as claimed in claim 6, wherein the rear camera is a wide-angle camera.

11. At least one non-transitory processor readable medium for storing a computer program of instructions configured to be readable by at least one processor for instructing the at least one processor to execute a computer process for performing the method as recited in claim 6.

* * * * *